(12) United States Patent
Dekoning

(10) Patent No.: US 9,907,233 B2
(45) Date of Patent: Mar. 6, 2018

(54) EXTRACTING HIGH MOISTURE GRAIN FROM STORAGE BAGS

(71) Applicant: Hubertus Dekoning, Neepawa Manitoba (CA)

(72) Inventor: Hubertus Dekoning, Neepawa Manitoba (CA)

(*) Notice: Subject to any disclaimer, the term of this patent is extended or adjusted under 35 U.S.C. 154(b) by 514 days.

(21) Appl. No.: 14/714,106

(22) Filed: May 15, 2015

(65) Prior Publication Data

US 2016/0219791 A1 Aug. 4, 2016

(30) Foreign Application Priority Data

Feb. 3, 2015 (CA) ..................... 2880757

(51) Int. Cl.
  *B02C 21/02* (2006.01)
  *A01F 25/20* (2006.01)
  *B02C 13/06* (2006.01)

(52) U.S. Cl.
  CPC .......... *A01F 25/2027* (2013.01); *A01F 25/20* (2013.01); *B02C 13/06* (2013.01); *A01F 2025/2063* (2013.01); *B02C 21/02* (2013.01)

(58) Field of Classification Search
  CPC .................. A01F 25/2027; A01F 25/20; A01F 2025/2063; B02C 13/06; B02C 21/02
  See application file for complete search history.

(56) References Cited

U.S. PATENT DOCUMENTS

| | | | | |
|---|---|---|---|---|
| 3,724,635 A * | 4/1973 | Byrd | ................... | A01F 25/2027 198/304 |
| 4,157,164 A * | 6/1979 | Helm | ................... | A01F 25/2027 198/513 |
| 4,187,990 A * | 2/1980 | Lundahl | ............... | A01D 90/105 241/101.3 |
| 4,243,346 A * | 1/1981 | Wolf | ................... | A01F 25/2027 198/517 |
| 4,369,927 A * | 1/1983 | Rozeboom | .......... | B01F 13/0035 241/101.76 |
| 4,420,119 A * | 12/1983 | Johnson | ................... | A01F 25/14 241/101.4 |
| 4,428,537 A * | 1/1984 | von der Heide | .... | A01F 25/2027 241/101.742 |

(Continued)

OTHER PUBLICATIONS

Canadian Patent Office Examination Report for the Application No. 2880757.

*Primary Examiner* — Sean Michalski
(74) *Attorney, Agent, or Firm* — Olive Law Group, PLLC

(57) ABSTRACT

An extractor apparatus for moving grain from a grain bag has a frame mounted for movement along the ground in a rearward direction, and an upright oriented main auger attached to a rear end of the frame. A knife extends rearward from the main auger to cut the grain bag. A feed auger extends horizontally right and left of the intake end of the main auger, and is configured to auger grain to the intake end of the main auger. A disintegrator shaft is mounted rearward of the feed auger and parallel to the feed auger, and a plurality of disintegrator blades are spaced along a length of the disintegrator shaft and extend outward from the disintegrator shaft. A drive system is operative to rotate the main auger, feed auger, and disintegrator shaft. The length of the disintegrator shaft can be adjusted to suit the width of a particular bag.

10 Claims, 2 Drawing Sheets

(56) References Cited

U.S. PATENT DOCUMENTS

| | | | | |
|---|---|---|---|---|
| 5,495,987 A * | 3/1996 | Slaby | ............... | A01F 25/2027 |
| | | | | 172/272 |
| 6,109,552 A * | 8/2000 | Strankman | .......... | A01F 25/2027 |
| | | | | 241/101.72 |
| 7,802,956 B2 * | 9/2010 | Schertz | ............... | A01F 25/2027 |
| | | | | 414/296 |
| 7,861,851 B2 * | 1/2011 | Dekoning | ............... | A01F 25/20 |
| | | | | 198/308.1 |
| 7,997,849 B2 * | 8/2011 | Twiestmeyer | .......... | A01F 25/20 |
| | | | | 241/101.742 |
| 8,251,630 B2 * | 8/2012 | Hilsabeck | ............... | B65G 53/48 |
| | | | | 198/506 |
| 8,336,704 B2 | 12/2012 | Dekoning | | |
| 9,055,717 B2 * | 6/2015 | Stumpe | ............... | A01F 25/20 |
| 9,301,451 B2 * | 4/2016 | Zastrow | ............... | A01F 25/20 |
| 2011/0073440 A1 * | 3/2011 | Dekoning | ............... | B65G 33/32 |
| | | | | 198/518 |

* cited by examiner

EXTRACTING HIGH MOISTURE GRAIN FROM STORAGE BAGS

CROSS REFERENCE TO RELATED APPLICATION

This application claims priority to Canadian Application Serial No. 2,880,757, filed Feb. 3, 2015, the entire disclosure of which is incorporated herein by reference in its entirety.

TECHNICAL FIELD

This disclosure relates to the field of agricultural product handling equipment and in particular an apparatus for extracting high moisture grain from storage bags.

BACKGROUND

Grain bags, typically made from plastic, are becoming popular for storing grain including corn, beans, wheat, and like agricultural products. The bags are attached to a loading machine which receives grain from a transport vehicle, and pushes the grain into the bag. As the bag fills, the machine moves ahead, such that the grain bag fills and stretches out behind the loading machine. A typical bag will be about ten to twelve feet across, and 200 or more feet long.

To unload the bag, an extractor machine is provided that includes feed augers extending laterally right and left along the ground from the input end of an upright oriented main auger. The main auger has an elevated discharge oriented to discharge into a transport vehicle.

Thus to unload a bag, the end of the bag is cut open and the feed augers moved into the bag. The machine moves forward as the grain is collected by the feed augers and raised to the transport vehicle by the main auger. A knife at the top rear of the machine is oriented to slice the top of the bag as the machine moves forward as the grain is removed.

In a typical machine the empty bag is taken up on a pinch roller so that grain left on the bag spills rearward and into the bag and is thus saved. Such grain bag extractors are disclosed for example in U.S. Pat. Nos. 7,861,851 and 8,336,704 to the present inventor Dekoning, U.S. Pat. No. 7,997,849 to Twiestmeyer, et al., and U.S. Pat. No. 8,251,630 to Hilsabeck et al.

These grain storage bags have become popular since the cost is only a few cents per bushel, and the bags can be filled in the field where the crop is grown, reducing the need for trucks to haul grain from the combine to distant storage facilities. Also it has been found that the plastic bags reduce or prevent air movement through the grain and so grain can be stored at a higher moisture content without spoiling than is possible in conventional storage.

SUMMARY OF THE INVENTION

The present disclosure provides a grain bag extractor apparatus that overcomes problems in the prior art.

The ability to safely store high moisture grain is a significant benefit. Harvest can proceed without waiting until the crop is dry enough for conventional storage. The high moisture grain can be kept in the bags and then dried if necessary at some more convenient time after the harvest is complete. In some cases it may also not be necessary to dry the grain, such as when using the grain for animal feed. High moisture grain can be removed from the bags and fed directly to the animals, and often can have improved feed characteristics over dry grain. For example corn with a moisture content of 30% or more, has been found to be advantageous because it is more readily digested.

A problem with storing high moisture grain often occurs when using the conventional grain bag extractors, as the grain tends to cake and does not flow readily. When the extractor cross augers contact dry grain, the grain flows down into the auger and also flows readily from outer sides of the bag to the augers. In contrast in high moisture grain the cross auger simply burrows a recess into the grain along the bottom of the bag and the caked grain refuses to fall. Removing high moisture grain from grain storage bags can be highly problematic The extractor cross augers are typically somewhat narrower than the width of the bag, which reduces the risk the outer ends of the auger will tear the bag. Dry grain will flow from the outer side portions of the bag into the feed auger however caked grain at the outer side portions of the bag that is not contacted by the feed auger does not flow.

The present disclosure provides an extractor apparatus for moving grain from a grain bag. The apparatus comprises a frame mounted for movement along the ground in a rearward operating travel direction, and an upright oriented main auger attached to a rear end of the frame such that an intake end thereof is above the ground and in proximity to the ground, and a discharge end thereof is oriented to discharge grain into a transport vehicle. A knife is mounted to the frame and configured to extend rearward from the main auger to cut the grain bag. A feed auger extends substantially horizontally right and left of the intake end of the main auger, and is configured to auger grain to the intake end of the main auger. A disintegrator shaft is mounted rearward of the feed auger and substantially parallel to the feed auger, and a plurality of disintegrator blades are spaced along a length of the disintegrator shaft and extend outward from the disintegrator shaft. A drive system is operative to rotate the main auger, feed auger, and disintegrator shaft.

The disintegrator shaft with disintegrator blades extending therefrom breaks up caked high moisture grain stored in grain bags so same will flow to the feed auger and main auger for effective extraction from the bag and transfer to a transport vehicle. The length of the disintegrator shaft can be varied to suit the width of a particular bag.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
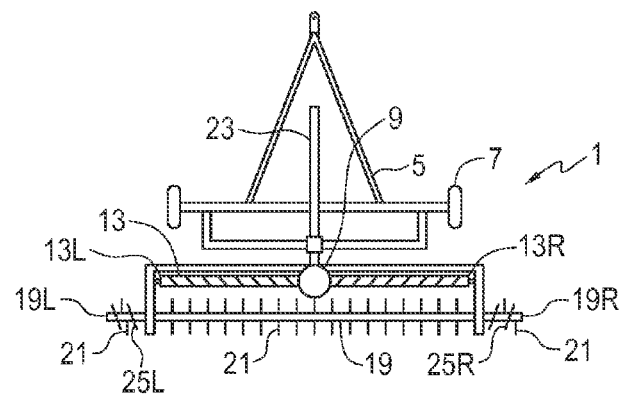
FIG. 1 is a schematic top view of an embodiment of the grain bag extractor apparatus of the present disclosure with the upper portion of the main auger removed.
Figure 2:
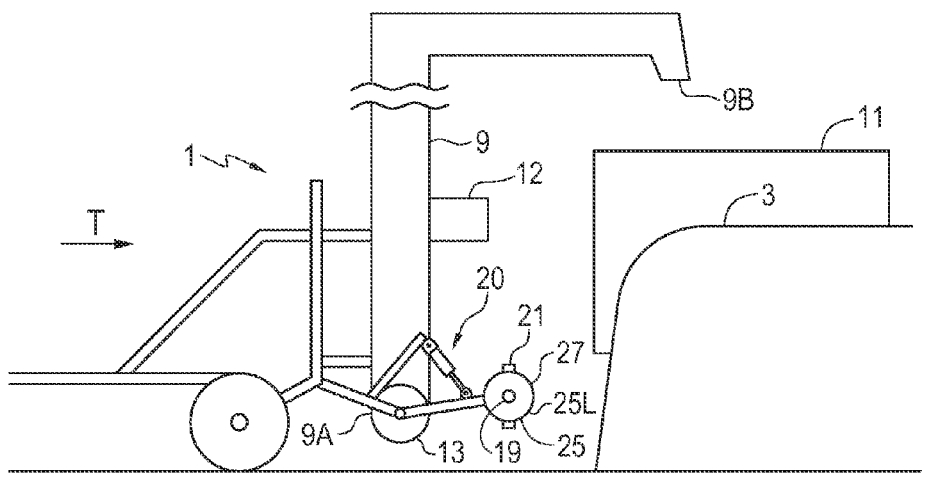
FIG. 2 is a schematic side view of the embodiment of FIG. 1.

FIGS. 1 and 2 schematically illustrate an embodiment of an extractor apparatus 1 of the present disclosure for moving grain from a grain bag 3. The illustrated apparatus 1 comprises a frame 5 mounted on wheels 7 for movement along the ground in a rearward operating travel direction T An upright oriented main auger 9 is attached to a rear end of the frame 5 such that an intake end 9A thereof is above the ground and in proximity to the ground, and a discharge end 9B thereof is oriented to discharge grain into a transport vehicle 11. The upper discharge portion of the main auger 9 is removed in FIG. 1 for clarity of illustration of the apparatus 1. A knife 12 is mounted to the frame 5 and is configured to extend rearward from the main auger 9 to cut the grain bag 3.

A feed auger 13 extends substantially horizontally right and left of the intake end 9A of the main auger 9, and is configured to auger grain to the intake end 9A of the main auger 9. The pitch direction of the flighting on one side of the main auger 9 is opposite to that on the other side so that as the feed auger rotates grain is augured toward the middle where the main auger 9 is located.

The frame 5, main auger 9, and feed auger 13 are fairly standard in the bag extractor art. Further mechanisms are typically provided to pull on the bag 3 as it empties and wrap it up or spill it back on the ground for later disposal, and are not illustrated. As the typical prior art extractor moves rearward into the bag of grain, the grain flows freely down the front face of the grain pile and from the sides as the empty portion of the bag is lifted and gathered.

Figure 3:
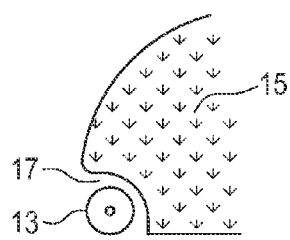
FIG. 3 is a schematic side view of the feed auger of a prior art grain bag extractor creating a recess in grain that is caked and will not flow freely.
Figure 4:
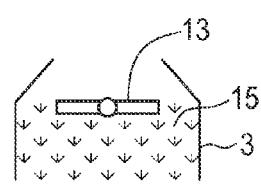
FIG. 4 is a schematic top view of the feed auger of a prior art grain bag extractor which is narrower than the bag such that caked grain at the outside portions of the bag is not contacted and does not flow into the feed auger.

FIG. 3 schematically illustrates a problem encountered in the prior art extractors where the grain 15 stored in the bag has a relatively high moisture content, such as 17-30% moisture content. Such grain can be safely stored in plastic grain bags with little risk of spoiling, but it is common for the higher moisture grain 15 to cake together after a time in storage such that the feed auger 13 just digs a recess 17 in the grain but the grain does not flow. It is typical in the prior art as well for the feed auger 13 to be somewhat narrower than the bag, as schematically illustrated in FIG. 4. Where the grain 15 is dry and flows freely the grain 15 from the outer sides of the bag 3 flows inward to the feed auger 13 as the bag is pulled up, however where the grain 15 is wetter and cakes together and does not flow freely, the grain at the outer edges of the bag 3 just stays in place. Thus extracting higher moisture grain from a grain bag is problematic.

Figure 5:
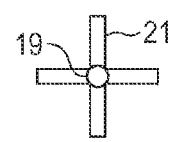
FIG. 5 is an end view of the disintegrator shaft of the embodiment of FIG. 1.

In the apparatus 1 of the present disclosure a disintegrator shaft 19 is mounted rearward of the feed auger 13 and substantially parallel to the feed auger 13 as seen in FIG. 1. A plurality of disintegrator blades 21 are spaced along a length of the disintegrator shaft 21 and extend outward from the disintegrator shaft 19 as schematically illustrated in FIG. 5.

A drive system 23, typically comprising a drive shaft connectable to a tractor power take off and an arrangement of gear boxes, sprockets, chains and the like as is known in the art, is operative to rotate the main auger 9, feed auger 13, and disintegrator shaft 19.

As the disintegrator shaft 19 rotates the disintegrator blades 21 contact the caked grain 15 and break it up so same flows and can be moved by the feed auger 13 into the intake 9A of the main auger 9. A raising mechanism 20, such as the linkage and hydraulic cylinder illustrated in FIG. 2, can be provided and be operative to selectively move the disintegrator shaft 19 up and down with respect to the feed auger 13 to facilitate breaking up badly caked grain 15.

In the illustrated apparatus 1 the right and left outer ends of the disintegrator shaft 19R, 19L extend laterally right and left beyond corresponding right and left ends 13R, 13L of the feed auger. Right and left auger flight sections 25R, 25L are mounted to corresponding right and left outer end portions of the disintegrator shaft 19 and are configured to move grain toward a center of the disintegrator shaft 19 when the disintegrator shaft 19 rotates. A plurality of disintegrator blades 21 extending outward from the disintegrator shaft 19 between flights of the right and left auger flight sections 25R, 25L and beyond outer edges 27 of the flights of the right and left auger flight sections 25R, 25L.

Extending the disintegrator shaft 19 beyond the outer ends 13R, 13L of the feed shaft 13 facilitates moving caked grain at outer edges of the bag into the feed auger 13. The auger flight sections 25 move the grain toward the center of the disintegrator shaft 19. By extending the disintegrator blades 21 beyond the outer edges 27 of the flight sections 25 the rotating blades 21 can break up caked grain so the auger flight sections do not simply carve a recess 17 such as schematically illustrated in FIG. 3.

Figure 8:
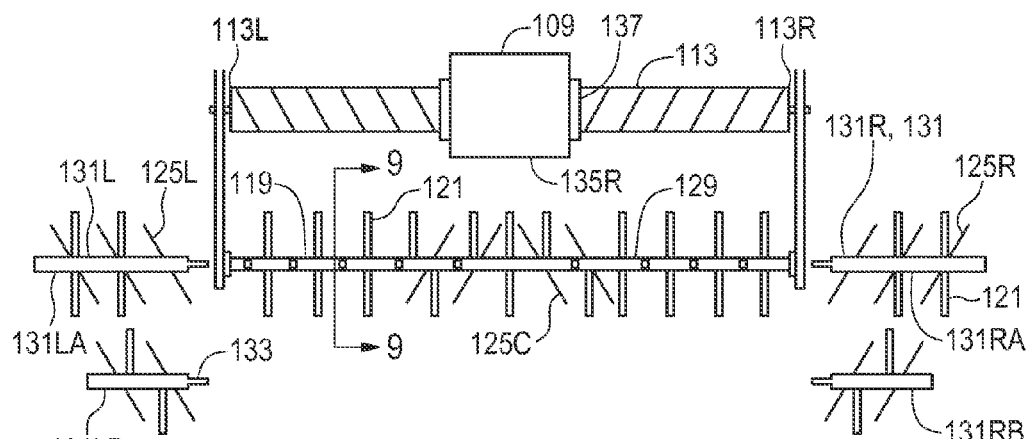
FIG. 8 is a top view of the alternate main auger and housing of FIG. 7 with a feed auger and adjustable length disintegrator shaft for use with same.

FIG. 8 schematically illustrates a disintegrator shaft 119 wherein the disintegrator shaft 119 comprises a center shaft section 129 with disintegrator blades 121 spaced therealong with right and left outer ends of the center shaft section 129 substantially aligned with right and left ends 113R, 113L of the feed auger 113. The right and left auger flight sections 125R, 125L and disintegrator blades 121 are mounted to right and left disintegrator shaft extensions 131R, 131L attachable to right and left outer ends of the center shaft section 129. In the illustrated disintegrator shaft 119 the disintegrator shaft extensions 131 each include a shaft section 133 that fits into the open ends of the center shaft section 129 and are secured with pins or the like.

Since the width of grain bags 3 is not standardized, and also depends somewhat on the type of grain being stored, disintegrator shaft extensions 131 of differing lengths can readily be provided to allow the operator to adjust the length of the disintegrator shaft 119 to suit a particular bag. In FIG. 8 first right and left disintegrator shaft extensions 131RA, 131LA have a first length as illustrated, and second right and left disintegrator shaft extensions 131RB, 131LB are shorter than the first right and left disintegrator shaft extensions 131RA, 131LA.

Figure 6:
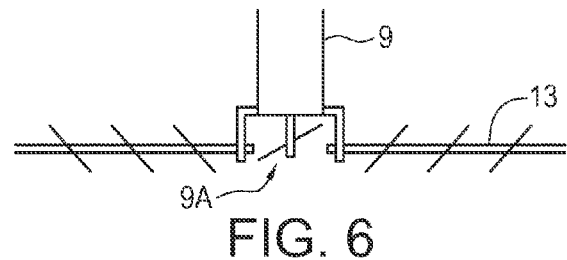
FIG. 6 is a rear view of the intake end of the main auger of the embodiment of FIG. 1.

The intake end 9A of the main auger 9 of the apparatus 1 illustrated in FIGS. 1 and 2 is schematically illustrated in FIG. 6. The intake end 9 is open on all sides so that the grain can enter same directly.

Figure 7:
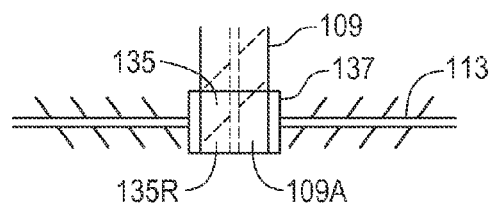
FIG. 7 is a rear view of the intake end of an alternate main auger that is used in some grain bag extractors where the intake end is enclosed in a housing.

FIG. 7 schematically illustrates an alternate type of intake end 109A used on the main auger 109 of some extractors. Here the intake end 109 of the main auger is mounted in a housing 135 with a closed rear surface 135R and the feed auger 113 augers grain to the intake end 109A of the main auger 109 through right and left side openings 137 of the housing 135. To accommodate such a main auger configuration FIG. 8 schematically illustrates the disintegrator shaft

119 comprising a center auger flight section 125C mounted on a center portion of the center shaft section 129 of the disintegrator shaft 119 and configured to auger grain laterally right and left from a center of the disintegrator shaft 119 to the right and left side openings 137 of the housing.

Figure 9:
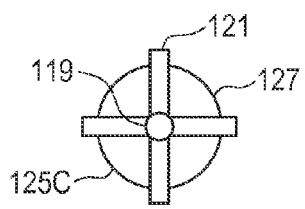
FIG. 9 is a schematic sectional view along line 9-9 in FIG. 8.

As schematically illustrated in FIGS. 8 and 9 a plurality of disintegrator blades 121 extend outward from the disintegrator shaft 119 between flights of the center auger flight section 125C and beyond outer edges 127 of the flights of the center auger flight section 125C.

The apparatus of the present disclosure uses a disintegrator shaft with disintegrator blades extending therefrom to break up caked high moisture grain stored in grain bags so same will flow to the feed auger and main auger for effective extraction from the bag and transfer to a transport vehicle. The length of the disintegrator shaft can be varied to suit the width of a particular bag.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An extractor apparatus for moving grain from a grain bag, the apparatus comprising:
   a frame mounted for movement along the ground in a rearward operating travel direction;
   an upright oriented main auger attached to a rear end of the frame such that an intake end thereof is above the ground and in proximity to the ground, and a discharge end thereof is oriented to discharge grain into a transport vehicle;
   a knife mounted to the frame and configured to extend rearward from the main auger to cut the grain bag;
   a feed auger extending substantially horizontally right and left of the intake end of the main auger, and configured to auger grain to the intake end of the main auger;
   a disintegrator shaft mounted rearward of the feed auger and substantially parallel to the feed auger, and a plurality of disintegrator blades spaced along a length of the disintegrator shaft and extending outward from the disintegrator shaft;
   a drive system operative to rotate the main auger, feed auger, and disintegrator shaft.

2. The apparatus of claim 1 wherein right and left outer ends of the disintegrator shaft extend laterally right and left beyond corresponding right and left ends of the feed auger.

3. The apparatus of claim 2 comprising right and left auger flight sections mounted to corresponding right and left outer end portions of the disintegrator shaft, the right and left auger flight sections configured to move grain toward a center of the disintegrator shaft when the disintegrator shaft rotates.

4. The apparatus of claim 3 comprising a plurality of disintegrator blades extending outward from the disintegrator shaft between flights of the right and left auger flight sections and beyond outer edges of flights of the right and left auger flight sections.

5. The apparatus of claim 4 wherein the disintegrator shaft comprises a center shaft section and wherein the right and left auger flight sections are mounted to right and left disintegrator shaft extensions attachable to right and left outer ends of the center shaft section.

6. The apparatus of claim 5 wherein the right and left outer ends of the center shaft section are substantially aligned with right and left ends of the feed auger.

7. The apparatus of claim 5 comprising first right and left disintegrator shaft extensions and second right and left disintegrator shaft extensions that are shorter than the first right and left disintegrator shaft extensions.

8. The apparatus of claim 1 comprising a raising mechanism operative to selectively move the disintegrator shaft up and down with respect to the feed auger.

9. The apparatus of claim 1 wherein the intake end of the main auger is mounted in a housing with a closed rear surface and the feed auger augers grain to the intake end of the main auger through right and left side openings of the housing, and comprising a center auger flight section mounted on a center portion of the disintegrator shaft and configured to auger grain laterally right and left from a center of the disintegrator shaft to the right and left side openings of the housing.

10. The apparatus of claim 9 comprising a plurality of disintegrator blades extending outward from the disintegrator shaft between flights of the center auger flight section and beyond outer edges of the flights of the center auger flight section.

\* \* \* \* \*